United States Patent [19]
White et al.

[11] 4,413,981
[45] Nov. 8, 1983

[54] SHEAVE

[76] Inventors: Eugene F. White; Frances H. White, both of Rte. 4, Box 118, both of Monroe, N.C. 28110

[21] Appl. No.: 273,248

[22] Filed: Jun. 12, 1981

[51] Int. Cl.³ .................. F16H 55/36; F16H 7/22; F16H 55/40; F16H 55/44
[52] U.S. Cl. .................. 474/94; 474/175; 474/195; 474/196; 474/902
[58] Field of Search .......... 474/175, 174, 195, 196, 474/94, 902, 161

[56] References Cited

U.S. PATENT DOCUMENTS

| | | | |
|---|---|---|---|
| 492,801 | 3/1893 | Holmes | 474/196 |
| 2,635,474 | 4/1953 | Hennings | 474/902 |
| 2,802,366 | 8/1957 | Borner | 474/175 |
| 2,925,739 | 2/1960 | Urquhart | 474/174 |
| 3,304,924 | 2/1967 | Dolza | 123/90 |
| 3,320,823 | 5/1967 | Kjellstrom | 474/175 |
| 3,321,549 | 3/1968 | Schrempp | 474/94 |
| 3,707,883 | 1/1973 | Kamenick | 474/174 |

FOREIGN PATENT DOCUMENTS

| | | | |
|---|---|---|---|
| 49053 | 3/1918 | Sweden | 474/196 |

*Primary Examiner*—Lawrence J. Staab
*Assistant Examiner*—Michael D. Bednarek
*Attorney, Agent, or Firm*—Daniel E. McConnell

[57] ABSTRACT

A sheave for engaging strand materials such as textile fabric yarns and the like. The sheave has spoke members transferring torques to and from a hub under compression and tension loading. The sheave also has an annular strand engaging groove with abutments for enhancing gripping engagement with a strand.

8 Claims, 5 Drawing Figures

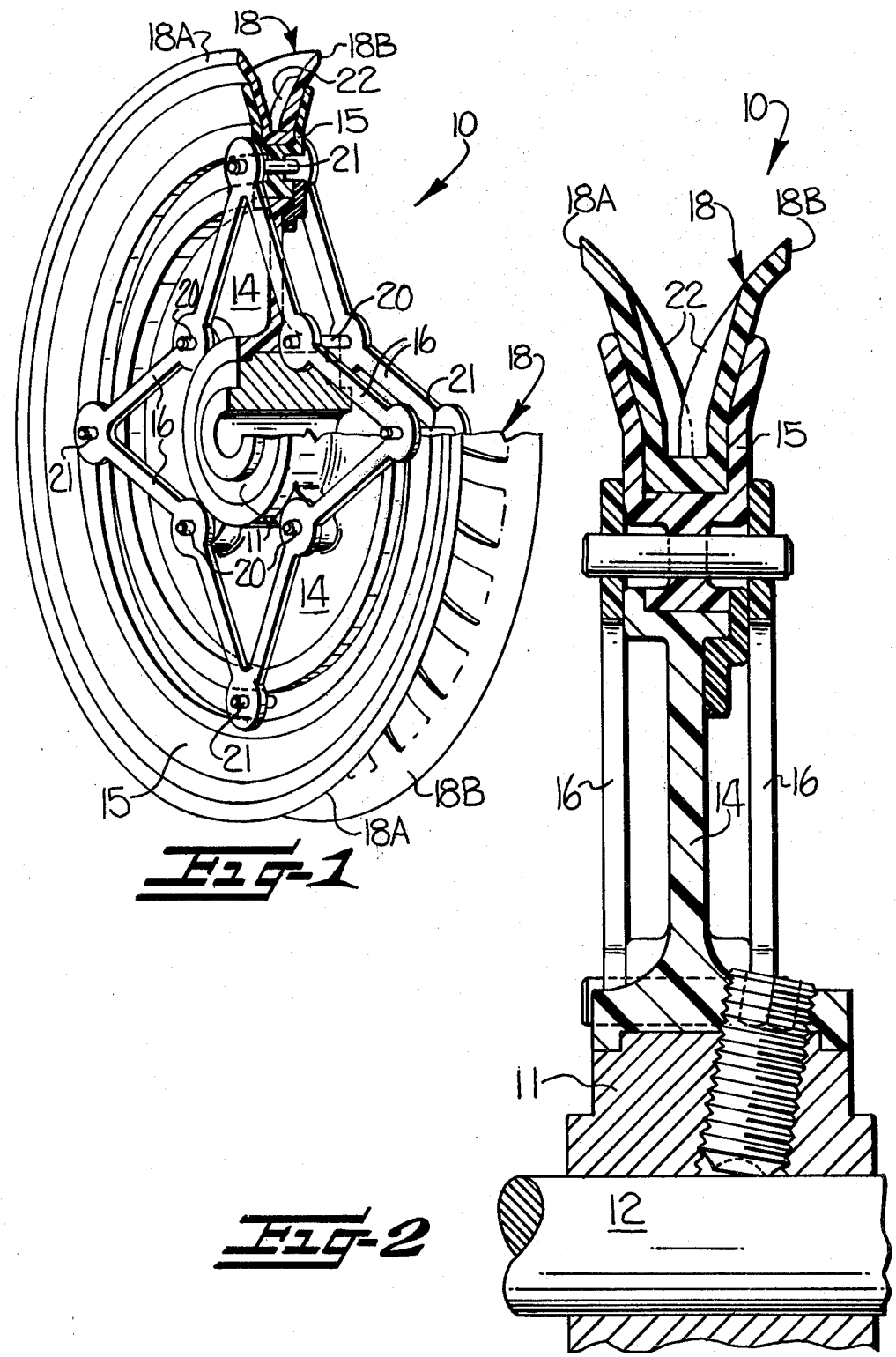

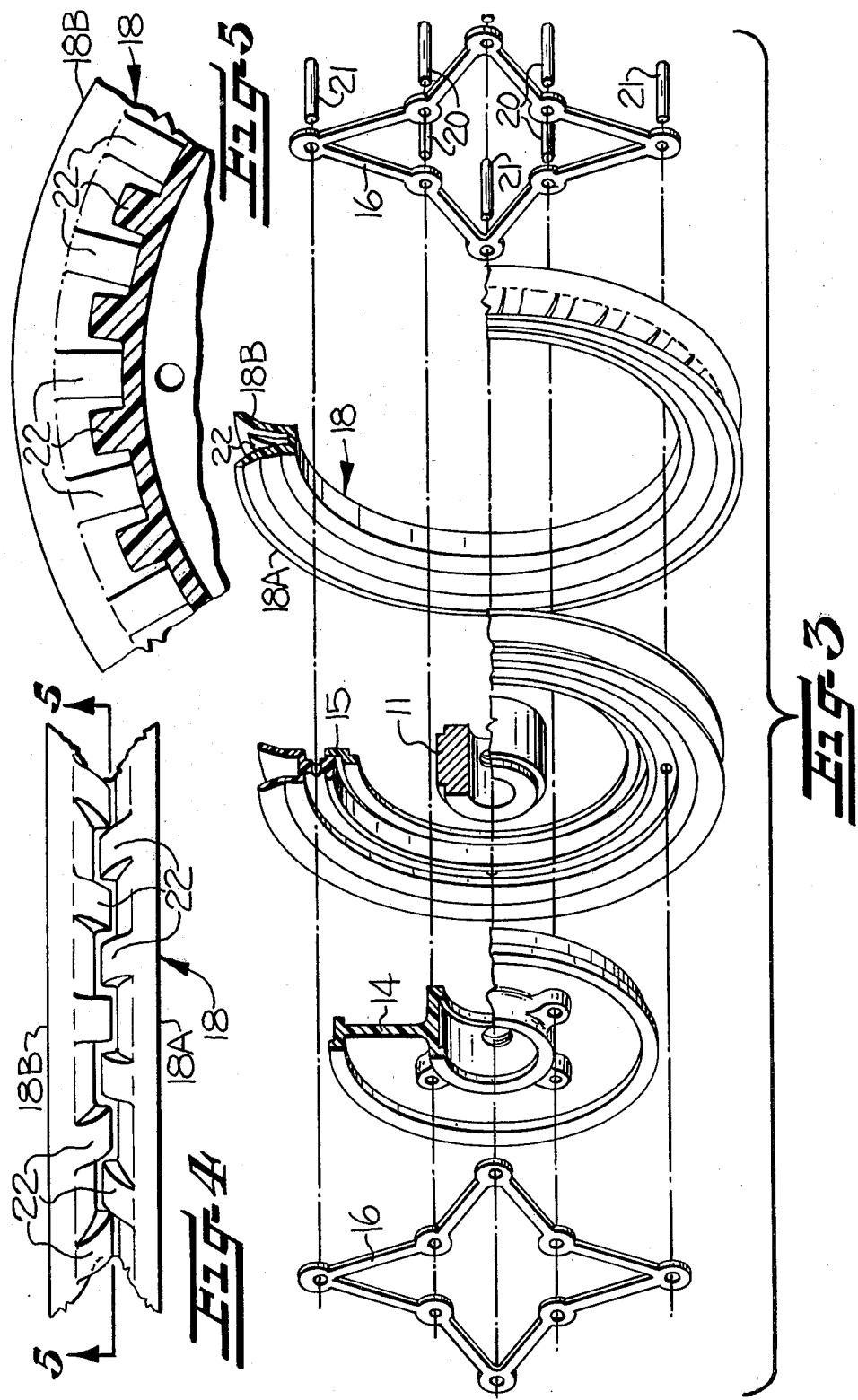

SHEAVE

FIELD AND BACKGROUND OF INVENTION

Strand materials such as textile yarns, filaments and the like frequently are guided or transported along predetermined paths of travel by entrainment of the strand materials about at least portions of circumferential strand receiving grooves of sheaves or pulleys. In certain strand handling operations, such pulleys or sheaves are driven or braked in order to control movement of or tension in the strand material while in other strand handling applications the rotation of such a sheave or pulley is used to measure lengths of strand material or rates of movement of strand material. Examples of such operations may be found in White U.S. Pat. No. 3,797,775 and White et al U.S. Pat. No. 3,858,416.

As will be appreciated, slippage of a strand material relative to an engaged sheave or pulley may present no difficulty where the only function for the sheave or pulley is to guide strand material along a desired path of travel. However, slippage can introduce significant inaccuracies in circumstances where strand material tension is being controlled or some characteristic of strand movement is being controlled or measured.

It has been proposed heretofore that the coordination of sheave rotation with strand movement may be improved by more positively gripping a strand which engages a sheave. In certain prior structures designed for such a purpose, an annular member or ring defining a circumferential groove has been mounted on a central hub which is affixed, by suitable means to a central shaft. While such arrangements have achieved some success, difficulty has on occasion been encountered due to high rates of change of rotational speeds such as occur on rapid acceleration or braking of strand movement. Relatively high torques arising under such circumstances may cause slippage of the elastomeric ring member relative to the hub, leading to loss of control and inaccuracy in measurements.

BRIEF DESCRIPTION OF INVENTION

It is an object of the present invention to improve coordination of sheave rotation with strand movement by accomplishing positive gripping of a strand which engages a sheave while accommodating high rates of change in torque applied. In realizing this object of the present invention, possibilities are opened for more accurately achieving strand feeding or supply and for more accurately determining characteristics of strand movement such as speed or quantity delivered.

Yet a further object of the present invention is to accommodate torque variations while more positively gripping a strand received within a circumferential groove of a sheave. In realizing this object of the present invention, a strand is passed in a tortuous, cusp-like strand engaging zone defined between opposing inner surfaces of outwardly diverging sidewall portions of an annular body.

BRIEF DESCRIPTION OF DRAWINGS

Some of the objects of the invention having been stated, other objects will appear as the description proceeds, when taken in connection with the accompanying drawings, in which FIG. 1 is a perspective view of a sheave in accordance with the present invention partly broken away to clarify certain constructional features;

FIG. 2 is an enlarged vertical section view through portions of the sheave of FIG. 1;

FIG. 3 is an exploded perspective view of components making up the sheave of FIGS. 1 and 2;

FIG. 4 is a plan view of the sheave of FIGS. 1 through 3, illustrating certain characteristics of a circumferential strand receiving groove thereof; and FIG. 5 is an elevation view, in section, through a portion of the sheave of FIGS. 1 through 4, taken generally along the line 5—5 in FIG. 4.

DETAILED DESCRIPTION OF INVENTION

The present invention will be described hereinafter with particular reference to the accompanying drawings in which one practical embodiment of the present invention is illustrated. However, it is to be understood at the outset of the description which follows that it is contemplated that persons skilled in the applicable art may modify specific constructional details of the sheave of this invention while achieving the desirable results accomplished by this invention. Accordingly, the description is to be understood as a broad teaching directed to persons skilled in the art and not as restrictive on the scope of this invention.

Referring now more particularly to the accompanying drawings, FIG. 1 illustrates the sheave of the present invention, generally indicated at 10, as comprising a hub member 11 formed of any suitable material such as metal and constructed for attachment to a shaft 12 which will define an axis about which the sheave 10 rotates. It is contemplated that the shaft 12 will be connected to some appropriate device (not shown) which may, in accordance with the present invention, either be a motive means such as an electrical motor, a brake means such as a magnetic particle brake, or a signalling means such as a shaft position transducer. In instances where the device is a motive means such as an electrical motor, the sheave 10 functions as a strand advancing or feeding device. In instances where the device is a brake, the sheave 10 functions as a tension control. In instances where the device is a shaft angle transducer or the like, the sheave 10 functions to signal desired information such as the velocity at which strand material is being moved along a predetermined path of travel or the length of strand material which has been moved within a measured time interval. It is believed that such usages of the sheave 10 of the present invention will be readily comprehended by persons skilled in the applicable arts, and it is further contemplated that the sheave 10 of the present invention may have utility in all such applications.

Mounted on the hub 11 is a planar body 14 of a suitable material such as a filled plastic and which performs the function of a carrier for spacing an annular member 15 from the hub 11. The body 14 and hub 11 are fixed to the shaft 12 by appropriate means such as a set screw. As best seen in FIGS. 2 and 3, the spacer 14 and annular member 15 are provided with mating circumferential shoulders.

In accordance with important characteristics of the sheave 10 of the present invention, the sheave comprises a plurality of resilient spoke members 16. The spoke members 16 are collectively disposed in a star-like configuration, with adjacent ones of the members 16 being inclined at equal and opposite angles with respect to a radius bisecting the angle included therebetween. As indicated, a total of eight spoke members 16 are provided on either side of the planar spacer member 14. Due to this number of spoke members 16 having been provided, the direction of the spoke members 16 in such that they are subjected to compression and tension loading in response to gripping engagement with a strand as described more fully hereinafter. Such compression and tension loading is to be distinguished from the essentially flexural loading which occurs with a radially extending spike as is found in a traditional bicycle wheel construction, for example.

In accordance with other characterizing features of the present invention, an annular body 18 having outwardly diverging sidewall portions 18A and 18B is mounted on the annular member 15. The sidewall portions 18A, 18B define between opposing inner surfaces thereof a circumferential strand receiving groove of predetermined radial depth. Forces arising from engagement of a strand with the annular body 18 are transmitted to and from the shaft 12 through the hub 11, pins 20 connecting the spacer member 14 with the spoke members 16, pins 21 connecting the spoke members 16 with the annular member 15, and thence to or from the annular body 18. A plurality of strand gripping abutments 22 project inwardly into the groove from the opposing sidewall portions 18A, 18B. Each of the projecting abutments 22 has a predetermined dimension circumferentially of the annular body 18 and a predetermined radial dimension relative to the depth of the groove. Adjacent ones of the projecting abutments 22 project inwardly from alternate ones of the opposing sidewall surfaces and are spaced circumferentially one from another at predetermined circumferential distances.

In the form illustrated, the projecting abutments 22 form two series, with one series being formed integrally with each of the two sidewall portions 18A, 18AB. Each series of projecting abutments may comprise a predetermined number of abutments, with each abutment spanning a predetermined portion of the circumference of the strand receiving groove. In certain forms of sheaves in accordance with the present invention which have been proposed, each abutment spans from about three to about six degrees of the circumference of the strand receiving groove and adjacent abutments in a common series are spaced at radial center line distances of from about seven and one-half to about fifteen degrees. In such a sheave, the two series of abutments 18 are radially displaced one from another by one-half that arcuate distance, or from about three and three-quarters to about seven and one-half degrees. The circumferential extent and spacing of projecting abutments 22 one from another, in such a sheave, is such that each abutment has radially directed sidewalls spaced at approximately one and one-half circumferential degrees from the next adjacent abutment. Experience thus far demonstrates that such geometry of a strand engaging groove may be varied depending upon the specific characteristics of the strand being engaged and the function being performed by the sheave. Accordingly, the specific numerical examples here given will be understood as illustrative only and as being subject to adaptation for specific uses of the sheave 10.

The projecting abutments 22 are contained entirely within the radial depth of the strand receiving groove, having radial dimensions less than the radial depth of the groove. Further, each of the projecting abutments 22 preferably has an abutment surface facing an opposing sidewall surface, which abutment surface is arcuate about a center spaced further from the opposing sidewall surface than from the sidewall surface from which the abutment projects. Thus, when viewed in an enlarged section, the abutment surfaces of adjacent abutments would be seen to define a cusp-like strand engaging zone (FIG. 2). By reason of the circumferential spacing of adjacent abutments, the strand engaging zone is of a tortuous configuration (FIG. 4).

In use, strand material entering into the strand receiving groove defined between the outwardly diverging sidewall portions 18A, 18B engages the surfaces of the projecting abutments 22 and is directed into a tortuous path. By means of such a tortuous path, the strand is more positively gripped by the sheave 10 of the present invention. Torque transmitted to or from the annular body 18 moves through the spoke members 16 which are loaded under compression or tension, depending upon the particular direction of torque imposed.

It is contemplated that the strand gripping characteristics of the sheave 10 of the present invention may be enhanced, particularly for textile strand materials, where the material of the annular body 18 is an elastomeric material such as a polyurethane having a minimum durometer hardness of 49D. It is anticipated that the ability of the sheave 10 to maintain accuracy and to transmit sharp variations in torque loading will be enhanced where the spoke members 16 similarly provide some flexibility in compression and tension loading, as opposed to being essentially rigid. That is, the spoke members 16 may preferably be elastomeric. When so formed the members may be stamped or cast or molded as an integral body.

In the drawings and specification, there has been set forth a preferred embodiment of the invention, and although specific terms are employed, they are used in a generic and descriptive sense only and not for purposes of limitation.

That which is claimed is:

1. A strand engaging sheave comprising a plurality of resilient spoke members, and an annular body formed of a soft elastomer encircling and mounted on said spoke members and defining a sheave axis and having outwardly diverging sidewall portions defining between opposing inner surfaces a circumferential strand receiving groove, said body having a plurality of strand gripping abutments projecting inwardly into said groove from said opposing sidewall surfaces, each said abutment having predetermined circumferential and radial dimensions, adjacent ones of said abutments projecting inwardly from alternate ones of said opposing sidewall surfaces and being spaced circumferentially one from another at predetermined distances, said abutments having arced planar surfaces facing opposing sidewall surfaces and defining planar radial walls lying on planes including said sheave axis and together defining a tortuous, cusp-like strand engaging zone for positively gripping a strand received within said groove.

2. A sheave according to claim 1 wherein said spoke members are arranged in a star-like configuration with adjacent ones of said spoke members inclined at equal and opposite angles with respect to a radial line bisecting the angle included therebetween, to thereby provide for compression and tension loading in response to gripping engagement of said body with a strand.

3. A sheave according to claim 1 wherein alternate ones of said abutments penetrate into space between adjacent, opposing abutments and are spaced therefrom at uniform, predetermined spacings.

4. A strand engaging sheave comprising a hub, an annular body formed of a soft elastomer and defining a sheave axis, said body having outwardly diverging sidewall portions defining between opposing inner surfaces a circumferential strand receiving groove of predetermined radial depth and having a plurality of strand gripping abutments projecting inwardly into said groove from opposing sidewall surfaces, each said abutment having a predetermined circumferential dimension, adjacent ones of said abutments projecting inwardly from alternate ones of said opposing sidewall surfaces and being spaced circumferentially one from another at a predetermined circumferential distance, each said abutment having a predetermined radial dimension less than said radial depth and an arced, planar abutment surface facing an opposing sidewall surface which abutment surface is arcuate about a center spaced further said opposing sidewall surface than from the sidewall surface from which said abutment projects and defines a planar radial wall lying on a plane including said sheave axis, said abutment surfaces of adjacent abutments defining a tortuous cusp-like strand engaging zone for positively gripping a strand received within said groove, said sheave further comprising a plurality of resilient spoke members extending generally tangentially of said hub for compression and tension loading upon gripping engagement of said body with a strand.

5. A sheave according to claim 4 wherein each said abutment spans from about three to about six degrees of the circumference of the strand receiving groove.

6. A sheave according to claim 4 wherein each abutment is symmetrical about a radially extending centerline and further wherein adjacent abutments are spaced one from another with from about three and three-quarters to about seven and one-half degrees of circumference of the strand receiving groove between the radial centerlines thereof.

7. A strand engaging sheave comprising a hub defining an axis of sheave rotation, a plurality of elastomeric spoke members extending generally tangentially outwardly from said hub, and an annular body of soft elastomeric material mounted on said spoke members, said body having outwardly diverging sidewall portions defining between opposing inner surfaces a circumferential strand receiving groove of predetermined radial depth and a plurality of strand gripping abutments formed integrally with said sidewall portions and projecting inwardly into said groove from said opposing sidewall surfaces, said abutments having predetermined, uniform circumferential dimensions and terminating circumferentially in radial walls lying on planes including said axis, adjacent ones of said abutments projecting inwardly from alternate ones of said opposing sidewall surfaces and being spaced one from another at predetermined, uniform circumferential distances, each said abutment having a predetermined, uniform radial dimension less than said radial depth and an arced planar abutment surface facing an opposing sidewall surface and which describes an arc about an abutment axis perpendicular to and spaced radially from said sheave axis and spaced further from said opposing sidewall surface than from the sidewall surface from which said abutment projects, said abutment surfaces of adjacent abutments defining a tortuous cusp-like strand engaging zone for positively gripping a strand received within said groove.

8. A sheave according to claim 7 wherein said groove has a predetermined, uniform dimension axially of said sheave axis, and said abutments have predetermined, uniform dimensions axially of said sheave axis and greater than one-half of said groove axial dimension.

* * * * *